United States Patent
Hunt

(10) Patent No.: US 12,023,609 B2
(45) Date of Patent: Jul. 2, 2024

(54) ADJUSTABLE RECEPTACLES

(71) Applicant: Process Wastewater Technologies, LLC, Rosedale, MD (US)

(72) Inventor: Edwin R. Hunt, Joppa, MD (US)

(73) Assignee: Process Wastewater Technologies, LLC, Rosedale, MD (US)

( * ) Notice: Subject to any disclaimer, the term of this patent is extended or adjusted under 35 U.S.C. 154(b) by 567 days.

(21) Appl. No.: 16/176,560

(22) Filed: Oct. 31, 2018

(65) Prior Publication Data

US 2020/0129894 A1 Apr. 30, 2020

(51) Int. Cl.
| | | |
|---|---|---|
| B01D 33/74 | (2006.01) |
| B01D 33/04 | (2006.01) |
| B01D 33/056 | (2006.01) |
| B30B 9/26 | (2006.01) |
| C02F 11/121 | (2019.01) |

(Continued)

(52) U.S. Cl.
CPC .......... *B01D 33/04* (2013.01); *B01D 33/056* (2013.01); *B01D 33/74* (2013.01); *C02F 11/121* (2013.01); *C02F 11/122* (2013.01); *C02F 11/123* (2013.01); *C02F 11/125* (2013.01); *B30B 9/12* (2013.01); *B30B 9/26* (2013.01)

(58) Field of Classification Search
CPC .. B01D 33/056; B01D 33/642; B01D 33/644; B01D 29/096; B01D 33/04; B01D 33/042; B01D 33/74; B01D 33/742; B01D 29/445; B01D 2201/204; B01D 25/02; B01D 29/05; B01D 29/114; B01D 29/35; B01D 29/52; B01D 29/82; B01D 29/94; B01D 33/11; B01D 33/275; B01D 33/42; B01D 33/466; B01D 33/50; B01D 33/60; B01D 33/72; B01D 33/722; B01D 33/804; B01D 33/805; B01D 33/806; B01D 37/03; B30B 15/32; B30B 9/12; B30B 9/246; B30B 9/26; B30B 9/163; B30B 9/18; B30B 9/125; C02F 11/121; C02F 11/122; C02F 11/123; C02F 11/125; C02F 1/004; C02F 2201/008
USPC ........................................................ 210/407
See application file for complete search history.

(56) References Cited

U.S. PATENT DOCUMENTS 1,971,546 A 8/1934 Tuttle
2,644,393 A 7/1953 Harden
(Continued)

FOREIGN PATENT DOCUMENTS

CN 211353759 U * 8/2020
WO 2004045318 A2 6/2004

OTHER PUBLICATIONS

International Search Report and Written Opinion of the International Search Authority dated Jan. 28, 2019 issued in corresponding International Patent Application No. PCT/US18/58429.
(Continued)

*Primary Examiner* — Hayden Brewster
(74) *Attorney, Agent, or Firm* — Locke Lord LLP

(57) ABSTRACT

An effluent collector includes a filtrate receiving portion having a filtrate opening, and a pressate receiving portion having a pressate opening. The effluent collector includes a diverter barrier adjustably positioned above the pressate receiving portion. The diverter barrier is configured to adjustably direct at least a portion of a flow path toward or away from the pressate receiving portion.

14 Claims, 10 Drawing Sheets

(51) Int. Cl.
*C02F 11/122* (2019.01)
*C02F 11/123* (2019.01)
*C02F 11/125* (2019.01)
*B30B 9/12* (2006.01)

(56) References Cited

U.S. PATENT DOCUMENTS

| | | | |
|---|---|---|---|
| 3,424,674 A | | 1/1969 | Webber |
| 4,266,473 A | * | 5/1981 | Hunt .................. B30B 9/12 100/117 |
| 4,286,512 A | | 9/1981 | Berggren |
| 4,563,278 A | | 1/1986 | Mutzenberg et al. |
| 4,651,637 A | | 3/1987 | Steinke |
| 5,021,166 A | * | 6/1991 | Torpey ................. B01D 33/60 210/709 |
| 5,380,436 A | | 1/1995 | Sasaki |
| 5,587,073 A | * | 12/1996 | Zittel .................... B01D 33/11 210/372 |
| 6,126,821 A | | 10/2000 | Corcoran |
| 6,382,500 B1 | | 5/2002 | Master et al. |
| 6,581,783 B2 | | 6/2003 | Blanche et al. |
| 6,634,508 B1 | | 10/2003 | Ishigaki |
| 7,150,826 B2 | | 12/2006 | Buckett |
| 7,191,700 B2 | | 3/2007 | Sasaki |
| 7,465,391 B2 | | 12/2008 | Heist et al. |
| 9,207,228 B2 | | 12/2015 | Saarenmaa et al. |
| 9,387,641 B2 | | 7/2016 | Kaneko et al. |
| 10,093,570 B2 | * | 10/2018 | Vette .................. C02F 11/121 |
| 2005/0167372 A1 | | 8/2005 | Heist et al. |
| 2005/0193902 A1 | | 9/2005 | Sasaki |
| 2005/0263448 A1 | | 12/2005 | Heist et al. |
| 2015/0076084 A1 | | 3/2015 | Tange |
| 2017/0259197 A1 | * | 9/2017 | Vette .................. C02F 11/122 |

OTHER PUBLICATIONS

Japanese Office Action dated Sep. 27, 2022, issued in corresponding Japanese Patent Application No. 2021-524325, and English translation, 8 pages.

Extended European Search Report dated May 23, 2022, issued during the prosecution of European Patent Application 1 No. 18938282.3.

* cited by examiner

ADJUSTABLE RECEPTACLES

BACKGROUND OF THE INVENTION

1. Field of the Invention

The subject disclosure relates to filtration systems, and more particularly to sludge filtration systems having receptacles for receiving filtrate.

2. Background of the Related Art

In general, a filtration system for wastewater acts to separate solids and liquids from one another in order to prepare both the solids and liquids for further processing. Filtration apparatuses typically include a mechanical or mechanical/electrical filtration system that drives influent through a filter to separate the solids and liquids from one another. These mechanical or mechanical/electrical filtration systems include, but are not limited to screw presses, centrifuges, ring presses, filter presses, plate and frame presses, rotary presses, or the like. Examples of some of these filtration systems are described in U.S. Pat. Nos. 5,380,436, 7,191,700, and 9,387,641, which are incorporated herein by reference in their entirety. In traditional filtration systems, the filtrate exiting from the filtration system is sent onwards to the next process. This sometimes includes filtrate that is not as clean as would be desired.

Traditional filtration systems have been considered satisfactory for their intended purpose. However, there is an ongoing need for filtration systems that provide cleaner filtrate and are more efficient.

SUMMARY OF THE INVENTION

As will be discussed in greater detail below in the Detailed Description section of this disclosure, the present disclosure is directed to effluent collectors, for example, those in filtration systems for collecting effluent. The effluent collector includes a filtrate receiving portion having a filtrate opening, and a pressate receiving portion having a pressate opening. The effluent collector includes a diverter barrier adjustably positioned above the pressate receiving portion. The diverter barrier is configured to adjustably direct at least a portion of a flow path toward or away from the pressate receiving portion.

The pressate receiving portion can include a pressate outlet downstream from the pressate opening. The diverter barrier can be movable with respect to the pressate opening. The diverter barrier can be positioned above the filtrate opening to adjustably direct at least a portion of a flow path toward or away from the filtrate receiving portion. The filtrate receiving portion and the pressate receiving portion can be defined in a common receptacle. The diverter barrier can be positioned in a flow path between an inlet of the receptacle and the pressate receiving portion and/or in a flow path between an inlet of the receptacle and the filtrate receiving portion. The diverter barrier can be a plate connected to the receptacle by a hinge and/or a track. The diverter barrier can include a series of movable tray portions. The pressate receiving portion can be positioned above the filtrate receiving portion. The pressate opening can be positioned above the filtrate opening.

In accordance with another aspect of the present disclosure, a filtration system includes a filtration assembly having an effluent inlet, a solids outlet downstream from the effluent inlet and a effluent outlet downstream from the effluent inlet. The system includes an effluent collector downstream from the effluent outlet. The effluent collector includes a filtrate receiving portion having a filtrate opening, a pressate receiving portion having a pressate opening, and a diverter barrier operatively connected to the effluent collector. The diverter barrier is adjustably positioned above the pressate receiving portion. The diverter barrier is configured to adjustably direct a flow path toward or away from the pressate receiving portion.

The pressate receiving portion, filtrate receiving portion and diverter barrier can be similar to those described above. The effluent collector can include a plurality of diverter barriers. Each of the diverter barriers can be proximate to a respective portion of the effluent outlet. The filtration assembly can be at least one of a screw press, a filter press or a belt press. In accordance with some embodiments, the pressate receiving portion is positioned more proximate to the solids outlet than to the effluent inlet. The filtrate receiving portion can be positioned more proximate to the effluent inlet than to the solids outlet. It is also contemplated that, in some embodiments, the filtrate receiving portion is positioned closer to the effluent inlet than the pressate receiving portion is. The filtrate receiving portion and the pressate receiving portion can be defined in a common receptacle. The diverter barrier can be operatively connected to the receptacle and positioned in a flow path between the effluent outlet and the pressate receiving portion.

In accordance with another aspect of the disclosure, a method for retrofitting an effluent collector downstream from a filtration assembly includes providing a diverter barrier and positioning the diverter plate within an effluent collector. The effluent collector can include a filtrate opening and a pressate opening. The method includes connecting the diverter barrier to the effluent collector to adjustably direct at least a portion of a flow path toward or away from the pressate receiving portion. The method includes attaching a pressate receiving portion to the effluent collector. The pressate receiving portion can define the pressate opening. The pressate receiving portion can be a pressate catch basin.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those having ordinary skill in the art to which the present disclosure pertains will more readily understand how to employ the systems and methods of the present disclosure without undue experimentation, certain embodiments thereof will be described in detail below with reference to the drawings, wherein.

These and other aspects of the subject disclosure will become more readily apparent to those having ordinary skill in the art from the following detailed description of the invention taken in conjunction with the drawings.

DETAILED DESCRIPTION

Figure 1:
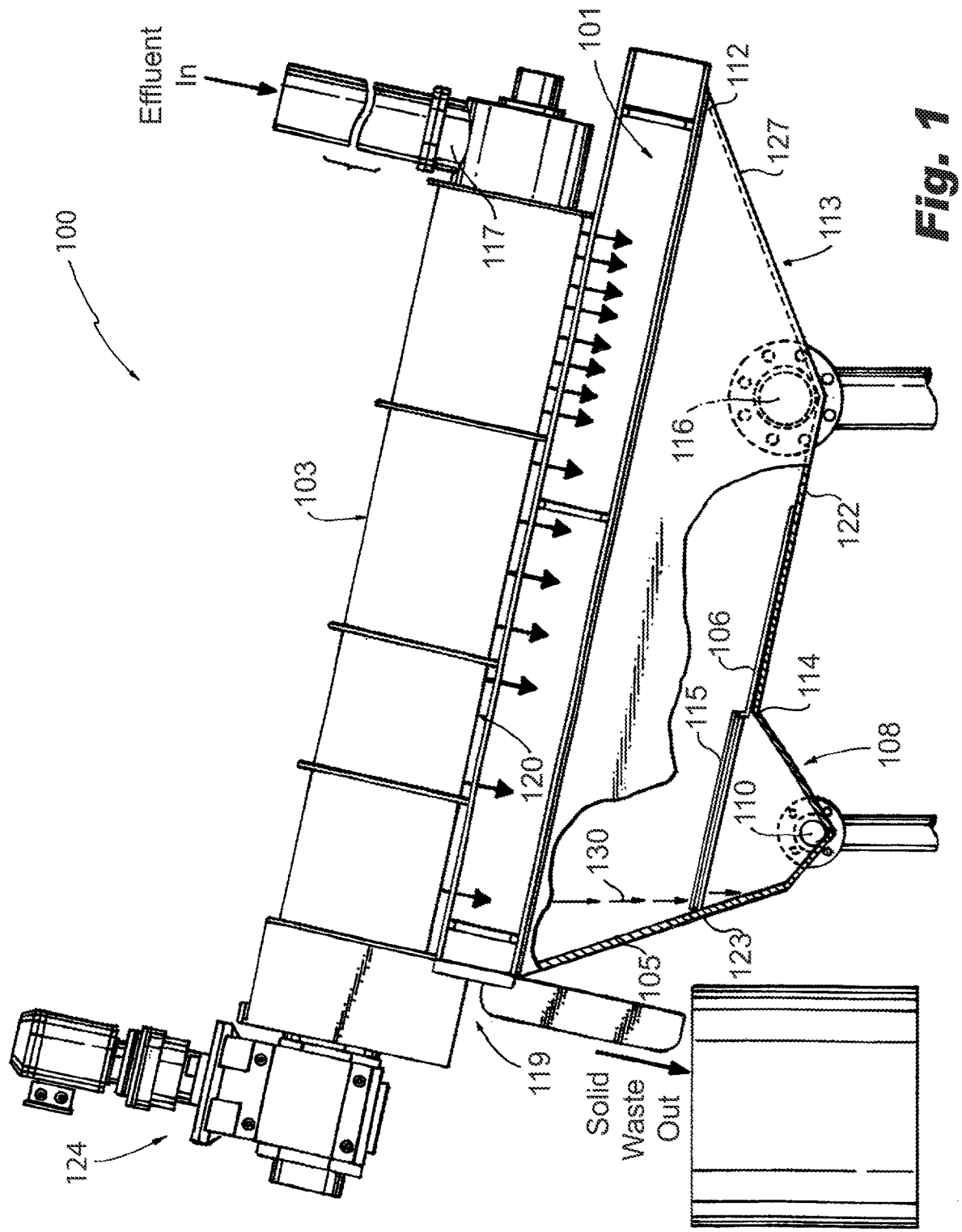
FIG. 1 is a schematic illustration of a side view of an embodiment of a filtration system constructed in accordance with the present disclosure, showing a diverter plate in an effluent collector downstream from a screw press filtration assembly.

Reference will now be made to the drawings wherein like reference numerals identify similar structural features or aspects of the subject disclosure. For purposes of explanation and illustration, and not limitation, a partial view of an exemplary embodiment of a filtration system having an adjustable effluent collector constructed in accordance with the disclosure is shown in FIG. 1 and is designated generally by reference character 100. Other embodiments of filtration systems in accordance with the disclosure, or aspects thereof, are provided in FIGS. 2-10, as will be described. The systems and methods described herein can be used to improve filtrate capture in filtration systems, which results in cleaner filtrate output. Well-known components, such as the filtration assemblies themselves, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

As shown in FIG. 1, a filtration system 100 includes an adjustable effluent collector 101 downstream from a screw press filtration assembly 103. Filtration assembly 103 includes an effluent inlet 117, a solids outlet 119 downstream from the effluent inlet 117, and a filtrate outlet 120 downstream from the effluent inlet 117. Those skilled in the art will readily appreciate that the filtrate outlet 120 of screw press filtration assembly runs along the length of the screw press assembly 103, this is indicated schematically by the downward pointing arrows, which are intended to schematically indicate filtrate fluid exiting filtrate outlet 120. The effluent collector 101, which is positioned below filtrate outlet 120, includes a common receptacle 105 configured to receive filtrate exiting from the filtrate outlet 120. The frequency of the downward pointing arrows extending from filtrate outlet 120 is intended to schematically indicate the volume of fluid exiting from filtrate outlet 120. Early on in filtration, e.g. closer to inlet 117, there is a higher volume of fluid exiting filtrate outlet 120, and therefore more arrows, and less pressure is required to extract the fluid. Later on in filtration, there is less fluid remaining and more pressure is required in order to extract the remainder of the fluid from the effluent being filtered, meaning that more pressure is required, therefore less arrows.

Figure 2:
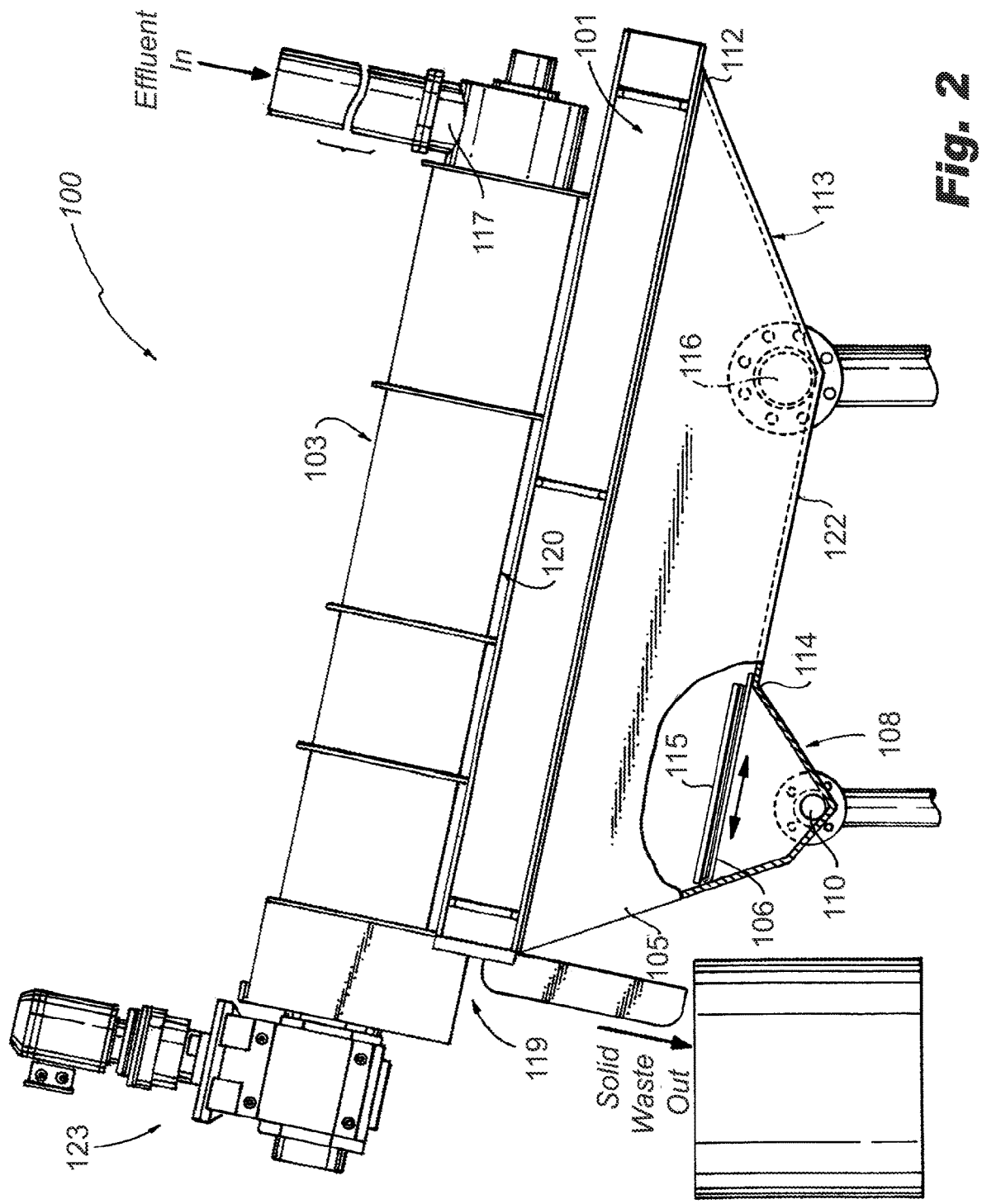
FIG. 2 is a schematic illustration of a side view of the filtration system of FIG. 1, showing the diverter plate a closed position.

With reference now to FIGS. 1-2, as the pressure increases across the filtration assembly 103, the likelihood for solids inadvertently being pushed through a screen of filtration assembly 103 increases, meaning that effluent exiting from filtrate outlet 120 closer to solids outlet 119 typically includes more solid particulates, e.g. is dirtier, than the effluent exiting from filtrate outlet 120 closer to effluent inlet 117. As such, in order to allow the cleaner effluent to exit filtration system 100, two sumps (a filtrate receiving sump/portion 113 and a pressate receiving sump/portion 108) are used. Filtrate receiving portion 113 has a filtrate opening 112, which, in this embodiment is the same as the opening for common receptacle 105. The pressate receiving portion 108 has a pressate opening 114, which is describe in greater detail below. Pressate receiving portion 108 includes a pressate outlet 110 that is downstream from pressate receiving portion 108 and in fluid communication with inlet 117 such that the filtrate received in pressate receiving portion 108 can be recycled back through system 100 via inlet 117. It is also contemplated that the filtrate exiting through pressate outlet 110 can be stored elsewhere and then recycled through system 100 at a later time.

Figure 3:
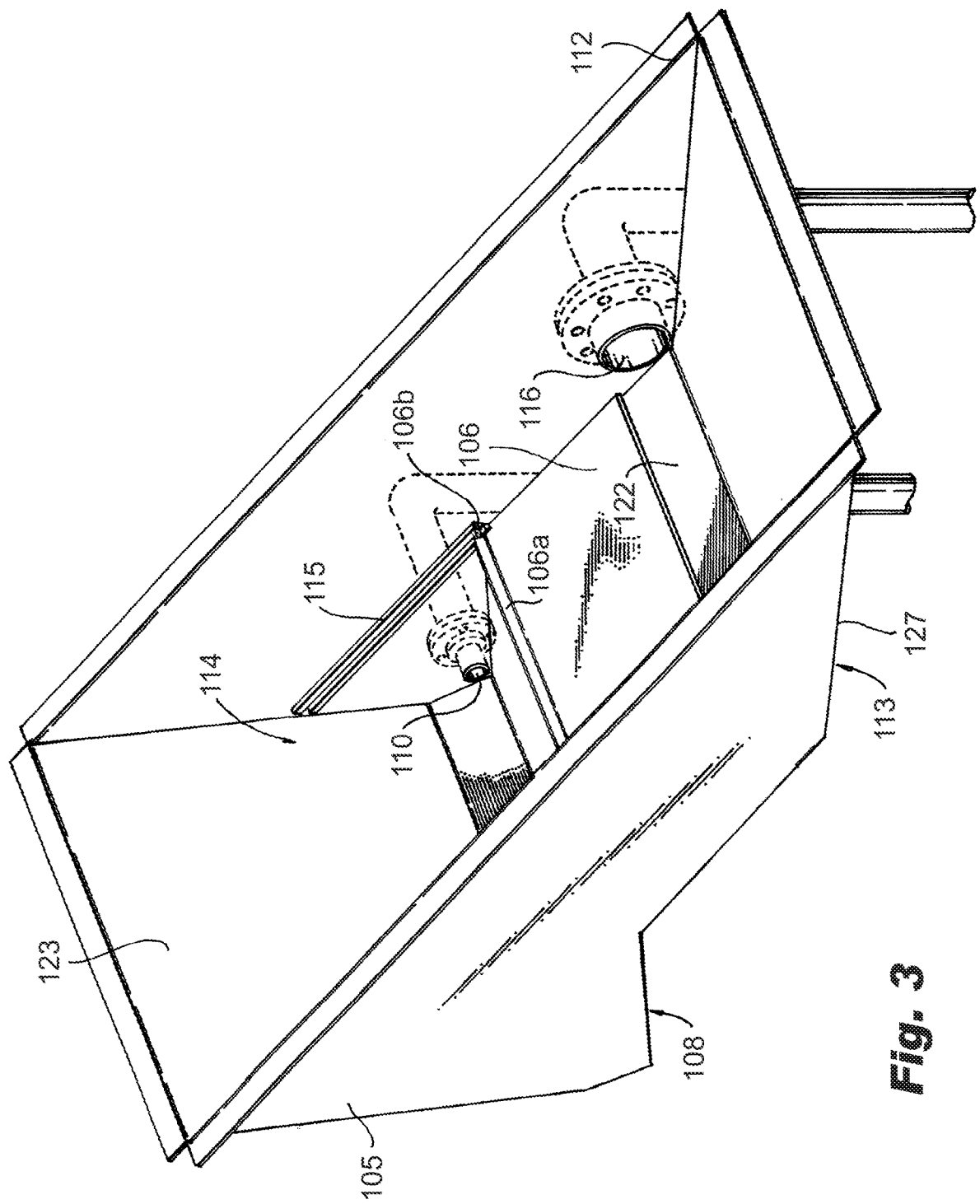
FIG. 3 is a schematic illustration of a perspective view of an effluent collector of FIG. 1 from the top side, showing the connection between the diverter plate and a track on the effluent collector positioned proximate to the opening of the pressate receiving portion of the effluent collector.

As shown in FIGS. 2-3, the first sump, e.g. filtrate receiving portion 113, is positioned in the lower pressure stage more proximate to the effluent inlet 117 than to the solids outlet 119, and the effluent collected therein can exit the system 100. The second sump, e.g. pressate receiving portion 108, is positioned proximate to the high-pressure stage and more proximate to the solids outlet 119 than to the effluent inlet 117, and the filtrate collected therein typically has higher solids concentration, e.g. it is "dirtier," than the filtrate closer to inlet 117. Because of this, the filtrate collected in the pressate receiving portion 108, exits from pressate outlet 110 and, if desired, is recycled back through filtration assembly 103, and the cleaner filtrate collected via the first sump, e.g. the filtrate receiving portion 113, and exits the system 100 for the next stage. Overall, this results in a cleaner output from system 100.

As shown in FIGS. 1-3, the receptacle 105 includes a diverter barrier 106, e.g. a diverter plate 106, operatively connected to a bottom wall 122. The diverter plate 106 is configured to adjustably occlude at least a portion of a flow path 130 (schematically depicted by a series of arrows) between the filtrate outlet 120 and the pressate receiving portion 108 in order to control the amount of filtrate from outlet 120 that enters into pressate receiving portion 108. The diverter plate 106 slides back and forth over pressate opening 114 on a track 115 depending on the desired amount of filtrate from 120 that is to be recycled, as indicated schematically by the double headed arrow in FIG. 2. The pressate opening 114 is defined between a peak/vertex on bottom wall 122 and a side wall 123 of receptacle 105. In FIG. 1, the lead line for numeral 114 is pointing to this vertex. This vertex is positioned higher than a filtrate portion outlet 116 and the pressate outlet 110. In other words, the opening 114 of the pressate receiving portion 108 is defined by a plane parallel to bottom wall 122 and extending from bottom wall 122 to side wall 123, e.g. the portion covered by plate 106 in FIG. 2. Diverter plate 106 includes a flange 106a that rests on side wall 123 when in the closed position.

As shown in FIG. 2, diverter plate 106 is in a closed position. This position may be used when it is desired to process effluent through system 100 in a quick manner, e.g. without the recycling described above. As shown in FIGS. 2-3, diverter plate 106 is connected to the receptacle 105 by the track 115, and may be secured by means of pins, a lead screw, belt, gears or other manual or automated mechanism to move it along the track and temporarily fix it to a desired location. In the embodiment of FIGS. 1-3, diverter plate 106 is engaged with track 115 by way of a pin 106b that extends from flange 106a in a direction transverse to the sliding direction of plate 106. Diverter plate 106 can be slid back and forth (in the directions indicated by the double headed arrow of FIG. 2) manually with a push rod, chain, or the like, or can be moved in another automatic mechanical means, e.g. with a belt, hydraulic system or other actuator device. Real-time adjustments can be made based on judgement of operator or based on measurements from a motor 124 driving the filter system (e.g. torque or power), or based on characteristics of the effluent and/or filtrate (e.g. temperature, clarity, etc.).

With continued reference to FIGS. 1-3, if it is desired to process the effluent faster, then the diverter plate 106 occludes more or all of opening 114 and there is less or no recycling. In that scenario, flow path 130 between outlet 120 and pressate receiving portion 108 will be all or partially blocked such that all or most of the filtrate will be directed to and will exit via filtrate portion outlet 116. Where clarity is more important, diverter plate 106 occludes less or none of opening 114 such that some or all of flow path 130 is directed to pressate receiving portion 108 and the filtrate exiting pressate outlet 110 is recycled, while the cleaner filtrate exits from filtrate portion outlet 116. Diverter plate 106 is configured to fully and/or partially occlude opening 114, or leave opening 114 entirely open, depending on the desired processing.

Figure 4:
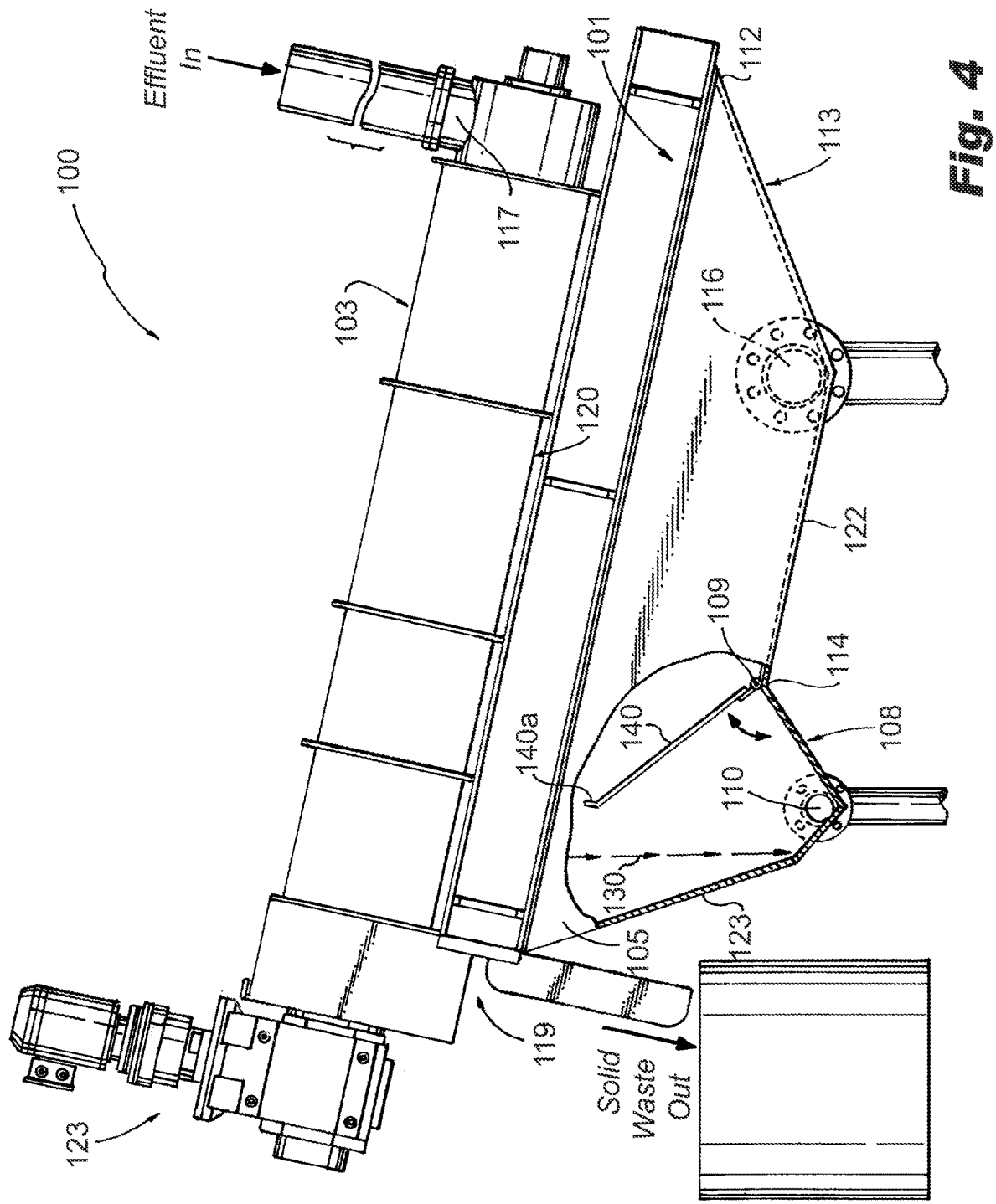
FIG. 4 is a schematic illustration of a side view of another embodiment of a filtration system constructed in accordance with the present disclosure, showing a hinged diverter plate in an effluent collector downstream from a screw press filtration assembly.

With reference now to FIG. 4, another embodiment of the filtration system 100 includes a diverter barrier in the form of a hinged diverter plate 140. Other than the connection of diverter plate 140 by way of a hinge 109, and the absence of track 115, the rest of the filtration system 100 is the same as that described above in FIGS. 1-3. Hinged diverter plate 140 of FIG. 4 can similarly include a push/pull rod, chain, belt, hydraulic system or other actuator device to rotate diverter plate about hinge 109, as indicated schematically by the double headed arrow. Similar to diverter plate 106 of FIGS. 1-3, flow path 130 from outlet 120 to pressate receiving portion 108 is adjustable such that, depending on the rotational position of plate 140, all, some or none of a portion of the flow path 130 can be directed toward pressate receiving portion 108. In a closed position, e.g. where diverter plate 140 is rotated downward and a flange 140a thereof is resting on the sidewall 123, filtrate fluid from outlet 120 would be directed away from pressate receiving portion 108.

Figure 5:
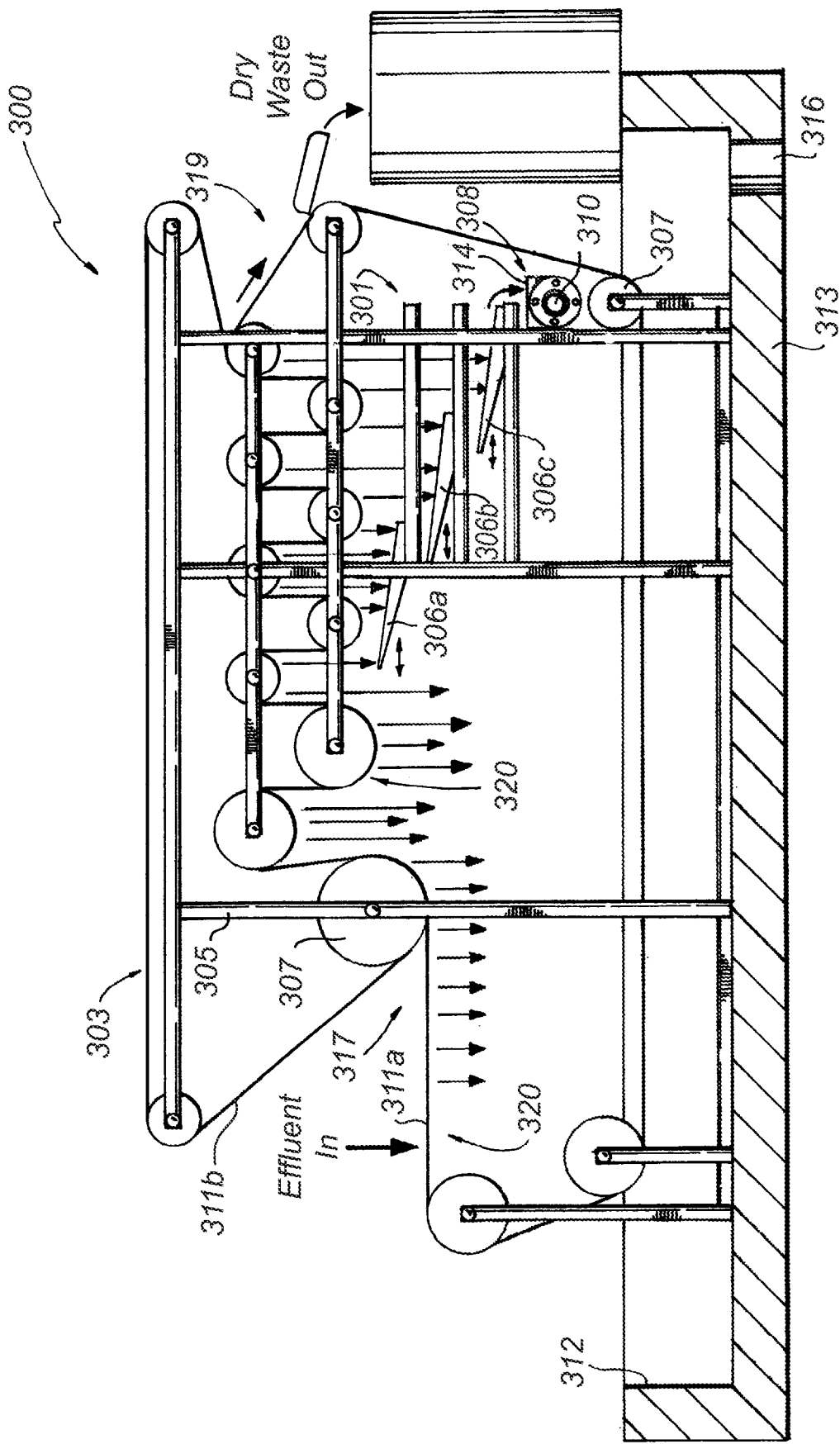
FIG. 5 is a schematic illustration of a side view of another embodiment of a filtration system constructed in accordance with the present disclosure, showing a series of diverter plates in an effluent collector downstream from a belt press filtration assembly.

As shown in FIG. 5, another embodiment a filtration system 300 is shown. Filtration system 300 includes a filtration assembly 303 and an adjustable effluent collector 301. In system 300, filtration assembly 303 is a belt press filtration assembly 303 having an effluent inlet 317, a solids outlet 319 and a filtrate outlet therebetween generally indicated by arrow 320. The outlet 320 of the belt press filtration assembly 303 runs along the length of a bottom belt 311a of the press from inlet 317 on the left hand side to solids outlet 319 on the right hand side. In the belt press filtration assembly 303 shown in FIG. 5, the effluent in side, e.g. the low-pressure side, is on the left hand side as oriented in FIG. 5. As more fluid is squeezed out of the effluent and as the effluent is moved to the right-hand side, the rollers 307 of the belt press become smaller and closer together and more pressure is applied. Adjustable effluent collector 301 includes a filtrate receiving portion 313 having a filtrate opening 312, and a pressate receiving portion 308 having a pressate opening 314. In system 300, pressate receiving portion 308 is a pressate catch basin 308. Filtrate receiving portion 313 is housekeeping pad or catch basin 313, e.g. a concrete catch basin. Filtrate receiving portion 313 includes an outlet 316. A diverter barrier 306 includes a series of diverter plates 306a, 306b, and 306c downstream from belt press filtration assembly 303. Plates 306a-306c are a series of plates that move relative to one another. As shown in FIG. 5, plates 306a-306c are connected to a frame 305 of filtration system 300.

Figure 6:
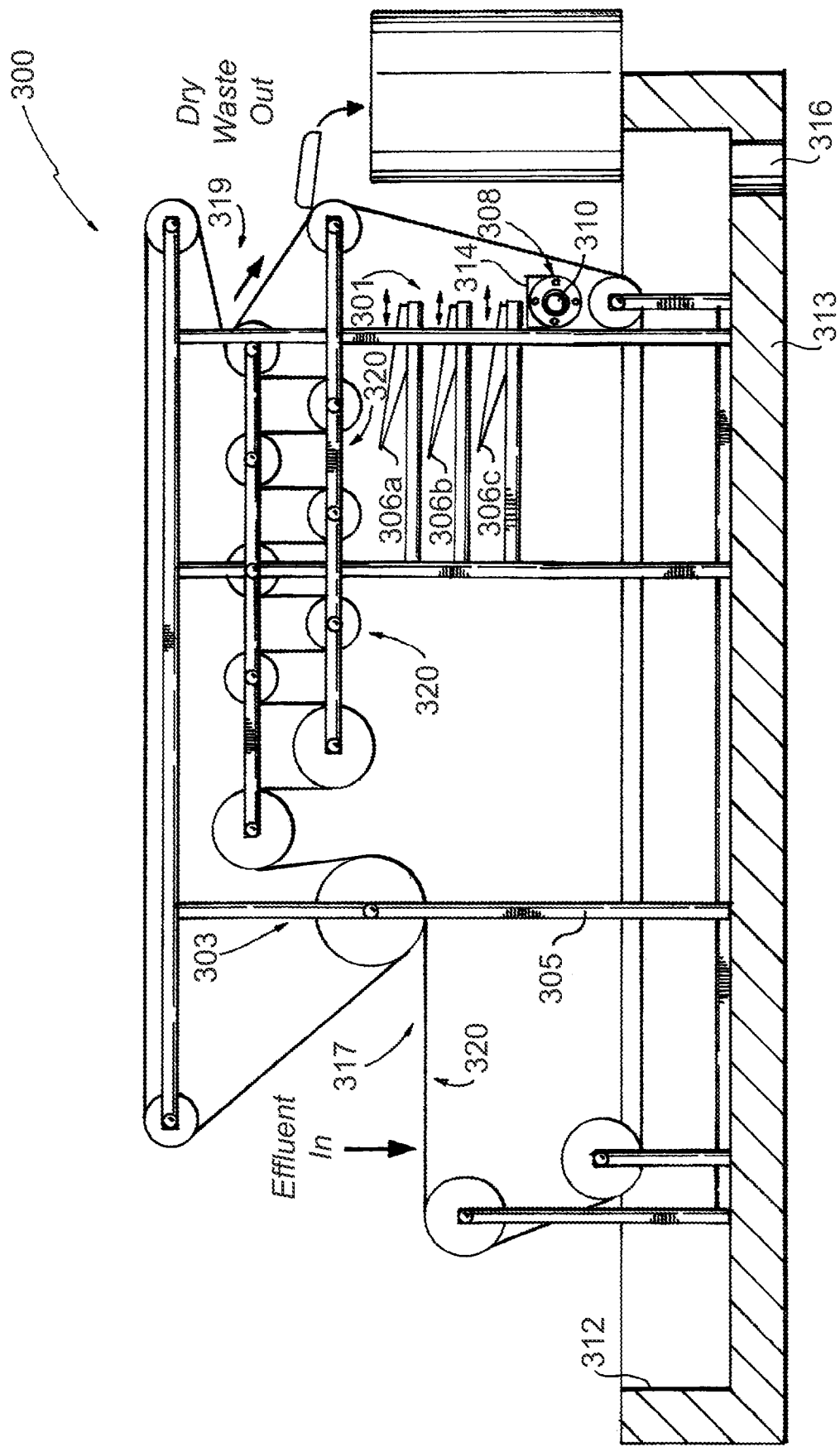
FIG. 6 is a schematic illustration of a side view of the filtration system of FIG. 5, showing the series of diverter plates in a retracted position.
Figure 7:
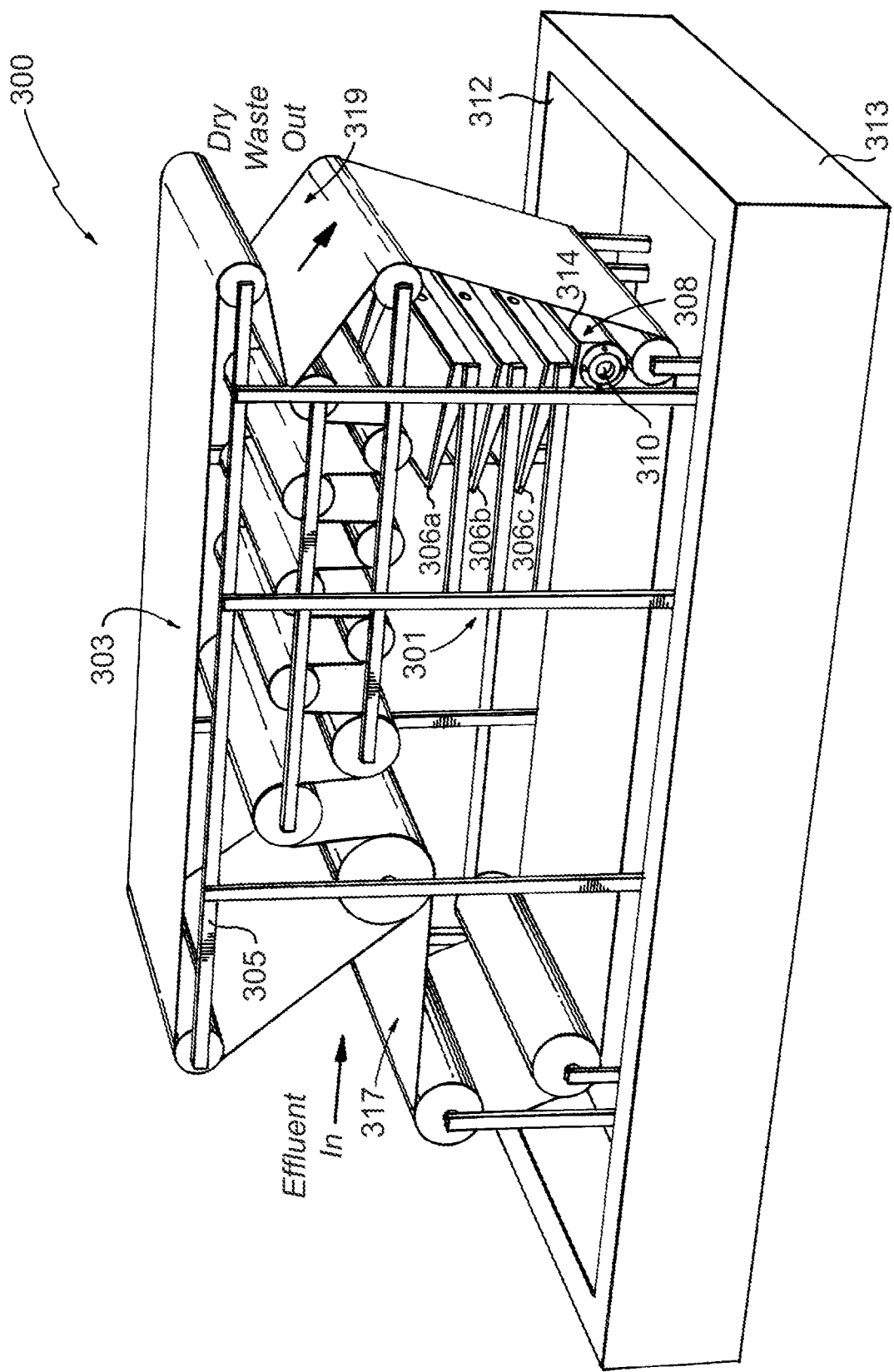
FIG. 7 is a schematic illustration of a perspective view of the filtration system of FIG. 5, showing how the diverter plates are connected to the frame of the belt press filtration assembly.

With continued reference to FIGS. 5-7, similar to system 100, the effluent exiting from filtrate outlet 320 on the high pressure side, e.g. the right hand side as oriented in FIGS. 5-7, typically includes more solid particulates, e.g. is dirtier, than the effluent exiting from filtrate outlet 320 on the right hand side of filter assembly 303. As such, in order to allow the cleaner effluent to exit system 300, pressate receiving portion/catch basin 308 is positioned at the right end of the filter system 300, e.g. the area that coincides with the higher pressure as described above, such that the filtrate received by pressate catch basin 308 is "dirtier" than the filtrate received by filtrate receiving portion/pan 313. Diverter plates 306a-306c, as described above, are configured to adjustably direct at least a portion of a flow path 330 toward or away from pressate catch basin 308 in order to control the amount of filtrate from outlet 320 that enters into filtrate receiving portion 313 and/or pressate receiving catch basin 308. In the embodiment of FIGS. 5-7, the flow path 330 is schematically indicated by all of the downwardly extending arrows extending from outlet 320.

As shown schematically by arrows of FIGS. 5-6, diverter plates 306a-306c can be retracted and/or extended as needed relative to one another and/or pressate catch basin 308 depending on the desired amount of filtrate from outlet 320 that is to be recycled. The retracted position of FIG. 6 may be used when it is desired to process effluent through system 300 in a quick manner, e.g. without the recycling described above. Those skilled in the art will readily appreciate that plates 306a-306c can be even further retracted relative to the catch basin 308, e.g. they can be moved further to the right hand side as oriented in FIG. 6, such that they entirely block flow from catch basin 308 and all fluid from outlet 320 is directed to filtrate receiving portion 313. Typically, if it is desired to process the effluent faster, then the diverter plates 306a-306c are retracted and less (or no) effluent from flow path 330 between outlet 320 and opening 312 is diverted to pressate catch basin 308. Where higher clarity is desired, the diverter plates 306a-306c are extended and block more of opening 312 and divert/direct more filtrate to pressate catch basin 308. The filtrate exiting pressate outlet 310 is then recycled back to effluent inlet, or stored for recycling later, while the cleaner filtrate can be manually or automatically removed from catch basin 313. As shown in FIG. 7, pressate outlet 310 is positioned on a side of catch basin. Outlet 310 can have a hose, or other conduit, in fluid communication therewith to direct fluid from catch basin 308 back to effluent inlet 317 of belt press filtration assembly 303.

Those skilled in the art will readily appreciate that prior to belt press filtration assembly 303, an inlet belt can be positioned upstream from inlet 317 and above belt 311a at inlet 317 to feed the effluent to effluent inlet 317. This optional third belt would allow initial filtrate draining before entering inlet 317 and pressing between belts 311a and 311b of press 303. Moreover, this optional third belt can be disposed in the same catch basin 313 so that the initial filtrate can be collected therein.

Figure 8:
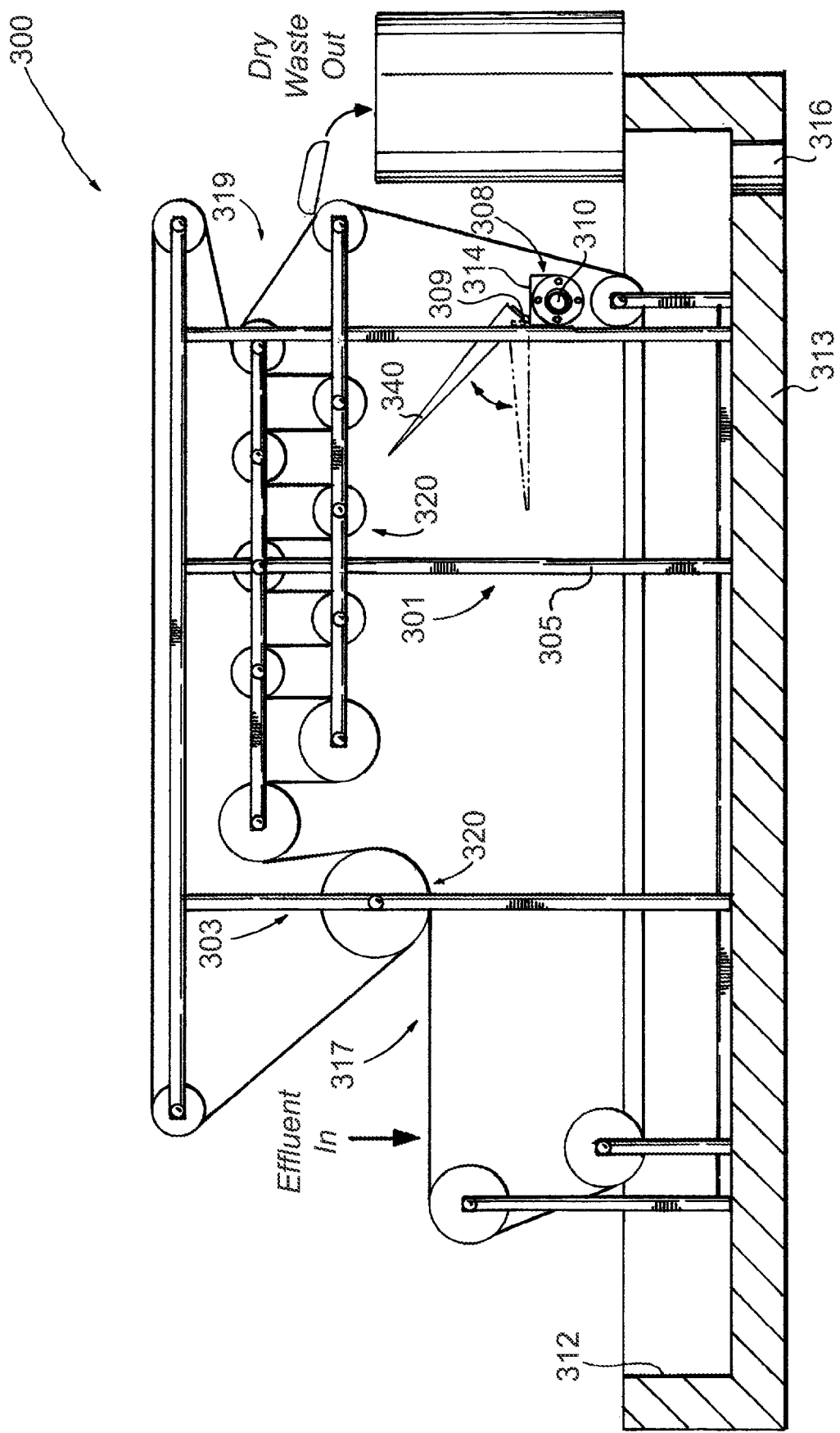
FIG. 8 is a schematic illustration of a side view of another embodiment of a filtration system constructed in accordance with the present disclosure, showing a hinged diverter plate in an effluent collector downstream from a belt press filtration assembly.

With reference now to FIG. 8, another embodiment of the filtration system 300 includes a hinged diverter plate 340 as a diverter barrier. Other than the connection of diverter plate 340 by way of hinge 309, instead of the series of diverter plates 306a-306b, the rest of the filtration system 300 is the same as that described above in FIGS. 5-7. Hinged diverter plate 340 of FIG. 8 can similarly include a push/pull rod, chain, belt, hydraulic system or other actuator device to rotate diverter plate about hinge 309, as indicated schematically by the double headed arrow. In the embodiment of FIG. 8, axis of hinge 309 about which diverter plate 340 rotates goes in an out of the page as oriented in FIG. 8. Similar to diverter plates 306a-306c of FIGS. 5-7, the flow from outlet 320 to inlet 314 can be directed toward pressate receiving portion 308, in whole or in part depending on the rotational position of diverter plate 340. Those skilled in the art will readily appreciate that you could also have a series of hinged diverter plates that would rotate about their own respective hinge axes. It is also contemplated that hinged diverter plate 340 can move from side to side, e.g. perpendicular with respect to the vertical supports on frame 305, toward pressate catch basin 308 to block flow to catch basin 308 entirely and direct all flow from outlet 320 to filtrate receiving portion 313.

Figure 9:
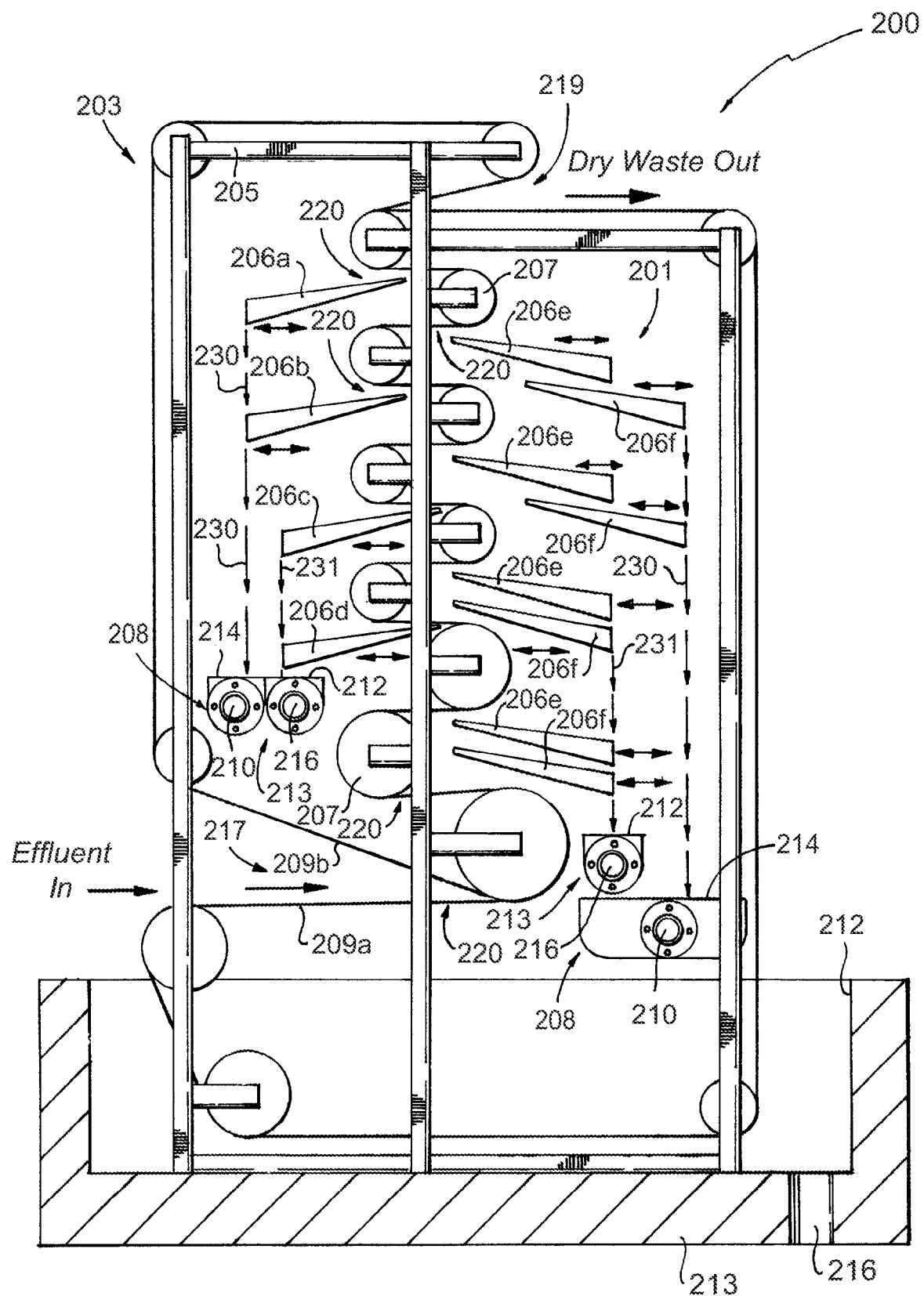
FIG. 9 is a schematic illustration of a side view of another embodiment of a filtration system constructed in accordance with the present disclosure, showing a plurality of diverter plates in an effluent collector downstream from various outlets of a vertical belt press filtration assembly.
Figure 10:
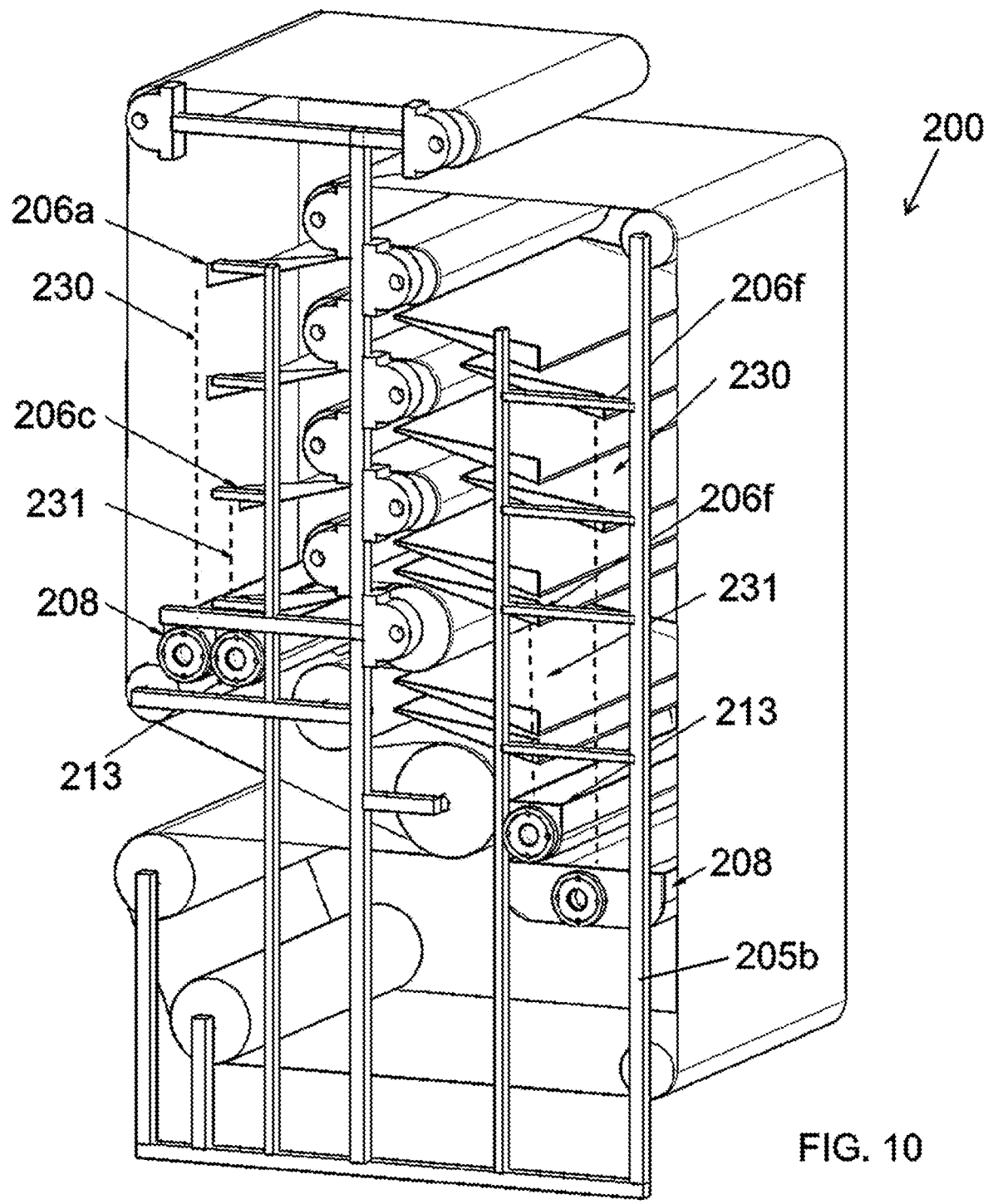
FIG. 10 is a schematic illustration of a perspective view of the filtration system of FIG. 9, showing a plurality of diverter plates in an effluent collector downstream from various outlets of a vertical belt press filtration assembly.

As shown in FIGS. 9-10, another embodiment a filtration system 200 is shown. Filtration system 200 includes a filtration assembly 203 and an adjustable effluent collector 201. In system 200, filtration assembly 203 is a vertical belt press filter having a effluent outlet generally indicated by arrows 220. Filtration assembly 203 has an effluent inlet 217 and a solids outlet 219. Outlet 219 is downstream from the effluent inlet 217 with respect to the movement of the belt, which moves from bottom to top. Effluent outlet 220 is downstream from the effluent inlet 217 in the same sense, e.g. effluent outlet 220 is after/above inlet 217 and before/below solids outlet 219. Effluent collector 201 is downstream from the effluent outlet 220 in the sense that portions thereof, described as diverter plates and catch basins below, receive fluid from effluent outlet 220.

With continued reference to FIGS. 9-10, the material for belts 209a and 209b is porous so the outlet 220 is a continuous outlet along the height of the belt press filtration assembly 203 from inlet 217 on the bottom to the solids outlet 219 on the top side. In the belt press shown in FIG. 9, the effluent-in side, e.g. the low-pressure side, is on the bottom as oriented in FIG. 9. As more fluid is squeezed out of the effluent and as the effluent is moved upward between belts 209a and 209b, the rollers 207 of the belt press become smaller and closer together and more pressure is applied. Adjustable effluent collector 201 includes filtrate receiving portions 213 that are catch basins, one on each side of belt press filtration assembly 203, and, optionally can also include a filtrate receiving portion 213 that is similar to housekeeping pad 313, which is also labeled 213 and is shown below assembly 203. Each filtrate receiving portion 213 defines a filtrate opening 212 and includes a filtrate portion outlet 216. Those skilled in the art will readily appreciate that the embodiment of FIGS. 9-10 does not need to include catch basins 213, and instead, fluid flow can drop down to a housekeeping pad filtrate receiving portion 213, similar to filtrate receiving portion 313. Effluent collector 201 includes pressate receiving portions 208, each having a respective pressate opening 214. In system 200, pressate receiving portions 208 are pressate catch basins 208, one on each side of filtration assembly 203.

With continued reference to FIGS. 9-10, a plurality of diverter barriers 206a-206f are staggered underneath various rollers 207 of assembly 203. Diverter barriers 206a-206f are diverter plates 206a-206f and are be movably attached to a frame 205 of filtration system 200. Effluent collector 201 is defined by diverter barriers 206a-206f and catch basins 208 and 213. For sake of clarity, portions of the frame 205 (e.g. the portions supporting diverter barriers 206a-206f and catch basins 208 and 213) are not shown so that the diverter barriers 206a-206f and catch basins 208 and 213, and the various flow paths may be readily apparent. Moreover, a frame 205b as shown in FIG. 10 varies slightly from frame 205 of FIG. 9, but the other portions of the system 200 remain the same. Those skilled in the art will readily appreciate that the frame 205b of FIG. 10 can be used instead of frame 205.

On the left hand side of FIG. 9, single diverter plates 206a-206d are arranged proximate to outlets 220 of assembly 203 proximate to respective rollers 207. Each of the diverter plates can be moved back and forth, e.g. toward or away from its respective roller 207, as indicated schematically by the double headed arrows, to adjustably direct at least a portion of a flow path toward catch basin 208. In FIG. 9, diverter plates 206a and 206b are in the extended position to direct a flow path exiting outlets 220 toward pressate catch basin 208. The flow path from diverter plates 206a and 206b to catch basin 208 is indicated schematically by a series of arrows labeled 230 in FIG. 9 and by a dashed line in FIG. 10. Diverter plates 206c and 206d are in the retracted position such that a flow path 231, indicated schematically by a series of arrows labeled 231 in FIG. 9 and by a dashed line in FIG. 10, from outlets 220 toward filtrate catch basin 213, is unblocked. Diverter plates 206a-206d can all be retracted, extended, or any combination thereof depending on how much fluid is desired to be directed to pressate catch basin 208.

In accordance with another embodiment, the right hand side of FIG. 9 shows pairs of diverter plates, each pair including diverter plate 206e and 206f. A given pair is arranged under a respective roller 207 such that fluid exiting from outlet 220 can be directed toward or away from pressate catch basin 208. On the top side, two pairs of diverter plates 206e and 206f are in the extended position, e.g. two diverter plates 206f are extended outward to direct fluid exiting from outlets 220 towards pressate catch basin 208, as indicated schematically by the flow path labeled 230. Diverter plates 206f act to direct at least a portion of a flow path between outlet 220 and filtrate catch basin 213 (which is shown in the lower portion of assembly 203 as flow path 231) toward pressate catch basin 208. On the bottom side of assembly 203, diverter plates 206f are retracted inwards, meaning that flow path 231 between outlets 220 and openings 212 of filtrate catch basin 213 is unblocked and the fluid from outlets 220 is directed to filtrate catch basin 213.

With continued reference to FIGS. 9-10, similar to systems 100 and 300, the effluent exiting from filtrate outlet 220 on the high pressure side, e.g. the top side as oriented in FIG.

9, typically includes more solid particulates, e.g. is dirtier, than the effluent exiting from filtrate outlet 220 on the bottom side of filter assembly 203. As such, in order to allow the cleaner effluent to exit system 200, the diverter plates 206a-206f, as described above, are configured to adjustably occlude at least a portion of a flow path between the filtrate outlet 220 and the filtrate opening 212 and direct filtrate from outlet 320 toward pressate catch basin 208.

As shown schematically by arrows of FIG. 9, diverter plates 206a-206f can be retracted and/or extended as needed relative to one another and/or pressate catch basin 208 depending on the desired amount of filtrate from outlet 220 that is to be recycled. For the embodiment on the left hand side of FIG. 9, the retracted position of plates 206c-206d may be used for some or all of plates 206a-206d when it is desired to process effluent through system 200 in a quick manner, e.g. without the recycling described above. Typically, if it is desired to process the effluent faster, then the diverter plates 206a-206d are retracted and divert less effluent to catch basin 208. Where higher clarity is desired, one or more of diverter plates 206a-206d are extended over filtrate catch basin 213 (e.g. similar to how diverter plates 206a-206b are shown) to block a flow path 231 to opening 212 and direct the flow path along path 230 to pressate catch basin 208. The filtrate exiting a pressate outlet 210 is then recycled back to effluent inlet, or stored for recycling later, while the cleaner filtrate can be manually or automatically removed from catch basin 213 by way of outlet 216.

For the embodiment on the right hand side of FIG. 9, the retracted position of plates 206f on the bottom of system 200 may be used for some or all of plates 206e and 206f when it is desired to process effluent through system 200 in a quick manner, e.g. without the recycling described above. Typically, if it is desired to process the effluent faster, then the diverter plates 206e and 206f are retracted and divert less effluent to catch basin 208. Where higher clarity is desired, one or more of diverter plates 206e and 206f are extended to the right hand side as oriented in FIG. 9 over filtrate catch basin 213 (e.g. similar to how diverter plates 206f on the top portion of system 200 are shown) to block a flow path 231 to opening 212 and direct the flow path to pressate catch basin 208. The filtrate exiting a pressate outlet 210 is then recycled or stored as described above. Those skilled in the art will readily appreciate that outlets 210 and 216 can have respective hoses or other conduits attached thereto to empty their respective catch basins 208 and 213.

Those skilled in the art will readily appreciate that aspects of systems 100, 200 and 300 are readily interchangeable and filter assemblies 103, 203 and 303 can readily be used with any of adjustable effluent collectors 101, 201 and 301. Moreover, "high-pressure," as used to describe areas of system 100, 200 or 300, generally means pressures ranging from 50-150 psi. Additionally, those skilled in the art will readily appreciate that catch basins (whether pressate or filtrate) may be drained via gravity or, if a pressate catch basin, may be pumped back to the effluent in point on the filter assembly. While axial movement of diverter barriers, e.g. 106, 306a-306c and 206a-206f, has been described it is also contemplated that diverter barriers can be rotated from side to side about a vertical axis, e.g. an axis defined by frame 205 or 305, to further direct fluid flow as needed to or away from a pressate catch basin. In this way, catch basins, e.g. 208 and 213, could be in the same vertical and horizontal position (as defined by FIG. 9) but would be side-by-side in a direction in and out of the page.

In accordance with another aspect of the disclosure, a method for retrofitting an effluent collector, e.g. effluent collectors 101, 201, and/or 301, downstream from a filtration assembly, e.g. filtration assemblies, 103, 203 and/or 303, includes providing a diverter barrier, e.g. diverter barriers 106, 206 and/or 306, and positioning the diverter barrier within the effluent collector. The effluent collector can include a filtrate opening, e.g. a filtrate opening 112, 212 and/or 312, and a pressate receiving portion, 108, 208 and/or 308, having a pressate opening, e.g. 114, 214 and/or 314. The method includes connecting the diverter barrier to the effluent collector to adjustably direct at least a portion of a flow path toward or away from the pressate receiving portion. The method includes attaching the pressate receiving portion to the effluent collector.

It is believed that the present disclosure includes many other embodiments that may not be herein described in detail, but would nonetheless be appreciated by those skilled in the art from the disclosures made. Accordingly, this disclosure should not be read as being limited only to the foregoing examples or only to the designated embodiments. The methods and systems of the present invention, as described above and shown in the drawings, provide for filtration systems that capture a higher amount of solids than traditional filtrations systems due to the ability of the adjustable effluent collector to separate dirtier portions of filtrate and recycle portions if needed. This provides for a system that filters/captures 97-99% of solids from effluent. While the apparatus and methods of the subject invention have been shown and described with reference to illustrative embodiments, those skilled in the art will readily appreciate that changes and/or modifications may be made thereto without departing from the spirit and scope of the subject invention.

What is claimed is:

1. An effluent collector for collecting effluent downstream from a filtration assembly, the effluent collector comprising:
  a receptacle configured and adapted to be positioned below the filtration assembly, wherein the receptacle defines a bottom wall and at least one side wall;
  a filtrate receiving portion having a filtrate opening and a filtrate outlet, wherein the filtrate portion outlet is formed in the receptacle;
  a pressate receiving portion having a pressate opening and a pressate outlet downstream from the pressate opening, wherein the pressate outlet is formed in the receptacle; and
  a diverter barrier mechanically coupled to at least one of the bottom wall of the receptacle, and/or the at least one side wall of the receptacle, wherein the diverter barrier is adjustably positioned above the pressate receiving portion, wherein the diverter barrier is configured to adjustably direct at least a portion of a flow path toward or away from the pressate receiving portion, wherein the diverter barrier is a diverter plate having a flange, wherein, in a closed position, the flange rests on the at least one side wall of the receptacle.

2. The effluent collector as recited in claim 1, wherein the diverter barrier is movable with respect to the pressate opening.

3. The effluent collector as recited in claim 1, wherein the diverter barrier is adjustably positioned above the filtrate opening to adjustably direct at least a portion of a flow path toward or away from the filtrate receiving portion.

4. The effluent collector as recited in claim 1, wherein the pressate opening is positioned above the filtrate opening.

5. The effluent collector as recited in claim 1, wherein the diverter barrier is operatively connected to the receptacle and positioned in a flow path between an inlet of the receptacle and the pressate receiving portion.

6. The effluent collector as recited in claim 1, wherein the pressate receiving portion is positioned above the filtrate receiving portion.

7. The effluent collector as recited in claim 1, wherein the diverter barrier is connected to the receptacle by at least one of a hinge or a track.

8. A filtration system comprising:
a filtration assembly having an effluent inlet, a solids outlet downstream from the effluent inlet and an effluent outlet, separate from the solids outlet, downstream from the effluent inlet; and
an effluent collector downstream from the effluent outlet configured and adapted to receive effluent from the effluent outlet, the effluent collector comprising:
a filtrate receiving portion downstream from the effluent outlet having a filtrate opening configured and adapted to receive effluent from the effluent outlet;
a pressate receiving portion downstream from the effluent outlet having a pressate opening configured and adapted to receive effluent from the effluent outlet; and
a diverter barrier adjustably positioned above the pressate receiving portion, wherein the diverter barrier is mechanically coupled to at least one of a bottom wall of the effluent collector, and/or at least one side wall of the effluent collector, wherein the diverter barrier is configured to adjustably direct at least a portion of a flow toward or away from the pressate receiving portion, wherein the diverter barrier is a diverter plate having a flange, wherein, in a closed position, the flange rests on the at least one side wall of the receptacle.

9. The system as recited in claim 8, wherein the diverter barrier is movable with respect to the pressate opening.

10. The system as recited in claim 8, wherein the diverter barrier is adjustably positioned above the filtrate opening to adjustably direct at least a portion of a flow toward or away from the filtrate receiving portion.

11. The system as recited in claim 8, wherein the pressate opening is positioned above the filtrate opening.

12. The system as recited in claim 8, wherein the pressate receiving portion is positioned more proximate to the solids outlet than to the effluent inlet.

13. The system as recited in claim 8, wherein the filtrate receiving portion is positioned more proximate to the effluent inlet than to the solids outlet.

14. The system as recited in claim 8, wherein the filtrate receiving portion and the pressate receiving portion are defined in a common receptacle, wherein the diverter barrier is operatively connected to the receptacle and positioned in a flow path between the effluent outlet and the pressate receiving portion.

* * * * *